(12) United States Patent
Kreisel

(10) Patent No.: US 11,008,121 B2
(45) Date of Patent: May 18, 2021

(54) SPACE BODY

(71) Applicant: Jörg Kreisel, Remscheid (DE)

(72) Inventor: Jörg Kreisel, Remscheid (DE)

(73) Assignee: iBOSS GmbH, Aachen (DE)

( * ) Notice: Subject to any disclaimer, the term of this patent is extended or adjusted under 35 U.S.C. 154(b) by 368 days.

(21) Appl. No.: 16/300,982

(22) PCT Filed: May 12, 2017

(86) PCT No.: PCT/DE2017/100401
§ 371 (c)(1),
(2) Date: Nov. 13, 2018

(87) PCT Pub. No.: WO2017/194058
PCT Pub. Date: Nov. 16, 2017

(65) Prior Publication Data
US 2019/0161213 A1 May 30, 2019

(30) Foreign Application Priority Data

May 13, 2016 (DE) .................... 10 2016 108 951.6

(51) Int. Cl.
*B64G 1/12* (2006.01)
*B64G 1/64* (2006.01)
*B64G 1/10* (2006.01)

(52) U.S. Cl.
CPC .............. *B64G 1/12* (2013.01); *B64G 1/10* (2013.01); *B64G 1/646* (2013.01); *B64G 2001/1092* (2013.01)

(58) Field of Classification Search
CPC . B64G 1/10; B64G 1/12; B64G 1/646; B64G 2001/1092; B64G 1/64; B64G 1/402; B64G 1/40; B64G 1/66; B64G 1/00; E04H 1/005; E04H 1/04; E04H 1/12; E04H 2001/1283
See application file for complete search history.

(56) References Cited

U.S. PATENT DOCUMENTS

| | | | | |
|---|---|---|---|---|
| 3,295,789 A | * | 1/1967 | Hill ........................ | B64G 1/12 244/159.3 |
| 3,300,162 A | * | 1/1967 | Maynard .................. | B64G 1/12 244/159.4 |
| 3,332,640 A | * | 7/1967 | Nesheim .................. | B64G 1/12 244/159.5 |
| 3,420,470 A | * | 1/1969 | Meyer .................... | B64G 1/641 244/173.3 |

(Continued)

FOREIGN PATENT DOCUMENTS

| | | |
|---|---|---|
| DE | 102015002367 A1 | 9/2015 |
| DE | 102014104695 A1 | 10/2015 |

(Continued)

*Primary Examiner* — Medhat Badawi
(74) *Attorney, Agent, or Firm* — Smartpat PLC

(57) ABSTRACT

A space body has at least two space modules which can be interchangeably connected to one another. At least one closable connection opening is in each case provided on the space modules, via which a passage is produced when the space modules are connected. Furthermore, at least one coupling device connects in each case the space modules to one another. A supply interface is provided for coupling a supply line of the space modules.

23 Claims, 2 Drawing Sheets

(56) References Cited

U.S. PATENT DOCUMENTS

| | | | | |
|---|---|---|---|---|
| 3,478,986 A * | 11/1969 | Fogarty | B64G 1/646 244/159.4 |
| 3,566,554 A * | 3/1971 | Schaffer et al. | E04B 1/34815 52/64 |
| 3,707,813 A * | 1/1973 | Cymbrowitz | E04B 1/34807 52/79.11 |
| 3,709,447 A * | 1/1973 | Devlin | B64G 1/12 244/159.4 |
| RE27,903 E * | 1/1974 | Fogarty | B64G 1/64 244/172.5 |
| 3,791,080 A * | 2/1974 | Sjoberg | E04B 1/3412 52/79.4 |
| 3,792,558 A * | 2/1974 | Berce | E04B 1/348 52/79.7 |
| 3,822,569 A * | 7/1974 | Lautrup-Larsen | A63H 33/04 446/85 |
| 3,955,328 A * | 5/1976 | Lindsay | E04B 1/34846 52/73 |
| 4,057,207 A * | 11/1977 | Hogan | B64G 1/60 244/159.4 |
| 4,079,904 A * | 3/1978 | Groskopfs | B64G 1/14 244/172.5 |
| 4,273,305 A * | 6/1981 | Hinds | B64G 1/14 244/172.5 |
| 4,384,692 A * | 5/1983 | Preukschat | B64G 1/1007 136/292 |
| 4,508,404 A * | 4/1985 | Frawley | H01R 13/629 244/135 A |
| 4,546,583 A * | 10/1985 | Hussar | E04B 1/04 52/236.1 |
| 4,715,566 A * | 12/1987 | Nobles | B64G 1/12 244/159.4 |
| 4,728,060 A * | 3/1988 | Cohen | B64G 9/00 244/159.4 |
| 4,744,533 A * | 5/1988 | Mullen | B64G 1/12 244/159.4 |
| 4,771,971 A * | 9/1988 | Ludwig | B64G 1/641 165/104.33 |
| 4,834,325 A * | 5/1989 | Faget | B64G 1/641 244/159.4 |
| 4,872,625 A * | 10/1989 | Filley | B64G 1/12 244/159.4 |
| 4,878,637 A * | 11/1989 | Mullen | B64G 1/12 244/159.4 |
| 4,880,187 A * | 11/1989 | Rourke | B64G 1/1078 244/159.4 |
| 4,903,919 A * | 2/1990 | Johnson | B64G 1/646 244/172.4 |
| 5,052,640 A * | 10/1991 | Chang | B64G 1/222 244/172.7 |
| 5,094,170 A * | 3/1992 | Raynaud | F42B 12/58 102/489 |
| 5,145,130 A * | 9/1992 | Purves | B25J 5/00 244/159.4 |
| 5,152,482 A * | 10/1992 | Perkins | B64G 1/22 244/159.4 |
| 5,199,672 A * | 4/1993 | King | B64G 1/007 244/164 |
| 5,271,582 A * | 12/1993 | Perkins | B64G 1/22 244/159.4 |
| 5,566,909 A * | 10/1996 | Lapins | B64G 1/105 244/173.3 |
| 5,791,600 A * | 8/1998 | Thompson | B64G 1/12 244/120 |
| 5,806,799 A * | 9/1998 | Lounge | B64G 1/12 244/159.4 |
| 6,138,951 A * | 10/2000 | Budris | B64G 1/002 102/393 |
| 6,299,107 B1 * | 10/2001 | Kong | B64G 1/646 244/172.4 |
| 6,354,457 B1 * | 3/2002 | Aaron | F17C 1/00 220/581 |
| 6,536,712 B1 * | 3/2003 | Barenett | B64G 1/10 244/158.3 |
| 6,669,148 B2 * | 12/2003 | Anderman | B64G 1/007 244/172.4 |
| 6,789,767 B2 * | 9/2004 | Mueller | B64G 1/007 244/173.3 |
| 7,988,096 B2 * | 8/2011 | Humphries | B64G 1/1078 244/158.1 |
| 8,006,937 B1 * | 8/2011 | Romano | B64G 1/646 244/172.4 |
| 8,047,473 B2 * | 11/2011 | Johnson | B64G 9/00 244/159.4 |
| 8,763,326 B2 * | 7/2014 | Takeshima | E04H 9/028 52/236.1 |
| 8,915,472 B2 * | 12/2014 | Aston | B64G 1/405 244/171.1 |
| D788,016 S * | 5/2017 | Blincow | D12/320 |
| 10,407,190 B2 * | 9/2019 | Fernandez | B64G 1/1085 |
| 2002/0035419 A1 * | 3/2002 | Lin | B64G 1/244 701/27 |
| 2011/0210750 A1 * | 9/2011 | Medelius | H01B 1/24 324/543 |
| 2011/0320429 A1 * | 12/2011 | Doig | G06F 16/972 707/711 |
| 2011/0321003 A1 * | 12/2011 | Doig | G06F 16/904 717/107 |
| 2012/0041634 A1 * | 2/2012 | Madhavanpillai | G01P 5/16 701/30.1 |
| 2012/0054143 A1 * | 3/2012 | Doig | G06Q 30/0269 706/47 |
| 2013/0334824 A1 * | 12/2013 | Freda | F03D 1/025 290/55 |
| 2015/0083865 A1 * | 3/2015 | Nakasone | B64G 1/428 244/158.6 |
| 2015/0375875 A1 * | 12/2015 | Dula | B64G 1/403 244/171.3 |
| 2016/0053941 A1 * | 2/2016 | Rebernik | F17C 3/02 206/583 |
| 2016/0130019 A1 * | 5/2016 | Jaeger | B64G 1/402 62/7 |
| 2017/0015443 A1 * | 1/2017 | Lakshmanan | B64G 1/64 |
| 2017/0210494 A1 * | 7/2017 | Blackwell | B64G 1/58 |
| 2017/0228616 A1 * | 8/2017 | Tasdizen | G06K 9/00664 |
| 2018/0186476 A1 * | 7/2018 | Poncet | B64G 1/646 |

FOREIGN PATENT DOCUMENTS

| | | |
|---|---|---|
| EP | 0196793 A1 | 10/1986 |
| WO | 9200223 A1 | 1/1992 |

* cited by examiner

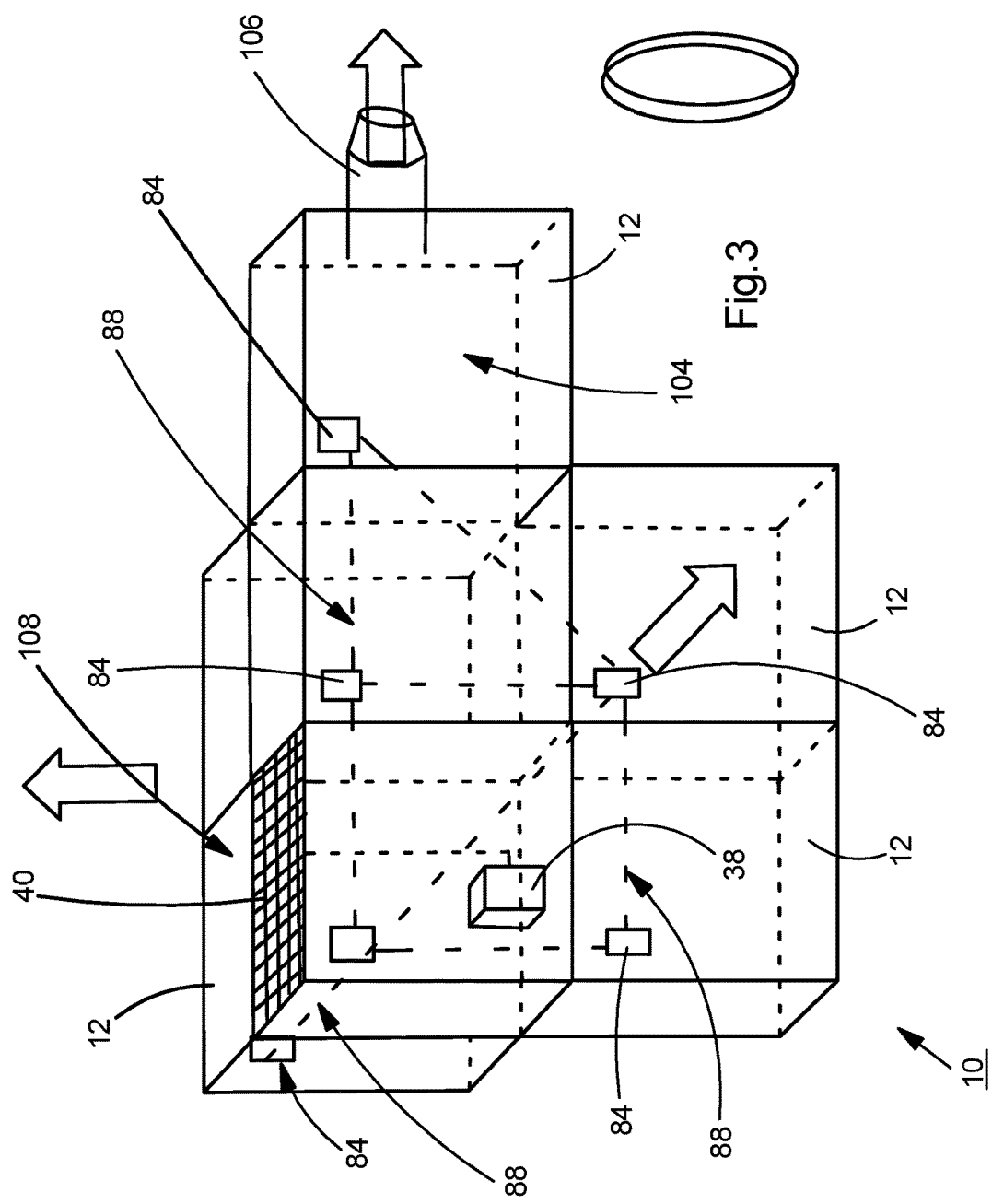

SPACE BODY

TECHNICAL FIELD

The invention relates to a space body with at least two space modules, which are interchangeable connectable.

BACKGROUND

From DE 10 2014 104 695 A1 a module with at least one coupling device is known for setting up a modular spacecraft. Furthermore, an androgynous coupling device for connecting modules is described. The coupling device is used to build up a modular constructed spacecraft, wherein the coupling device can be coupled to an identically constructed further androgynous coupling device for connecting the modules and comprises a plurality of coupling elements for this purpose. The interior of a sleeve-like linear guide element forms an expansion opening for interfaces providing network connection, data connection, hydraulic or pneumatic connection to the involved modules with each other. The sleeve-like linear guide element is surrounded by likewise sleeve-shaped nested coupling elements.

EP 0 196 793 A1 shows a modular satellite which modules comprise coupling devices for connecting the individual modules to one another. Each of these androgynous coupling modules is configured for coupling and connecting to an identically constructed coupling device and comprises a plurality of coupling elements for this purpose. With such an androgynous coupling device (androgynous interface) for orbitally maintainable satellite systems the reconfiguration of a modular satellite system composed of modules by robotic manipulation is enabled.

From WO 92/00223 an unmanned spacecraft is known. The spacecraft is configured modularly. Various subsidiary payload bodies are docked to a central mother body. Standardized interfaces are provided for this purpose, which enable the mother body to exchange for example control, data and electric energy with the subsidiary payload bodies. The subsidiary payload bodies are not self-sufficient systems and thus mostly dependent on the mother body. The subsidiary payload bodies serve only to provide further individual functions to the mother body.

The known space modules have the disadvantage that they may couple with each other, but not in any order. For example, the space modules can be coupled to a central satellite, but they cannot be assembled arbitrary in the known systems. This requires a precise planning especially concerning the control of the space modules. For this purpose, a separate central control module is required regularly for the entire space body, which takes over and coordinates the required control tasks of the individual space modules. The computer capacity of the controller is associated with the number of coupled space modules. The larger the space body is the more extensive is the control. If necessary, redundant systems are used in order to compensate controller failures. This is a complex system, which considerably increases the cost, for example for space flight.

SUMMARY

Thus, an object of the invention is to provide a space body with different space modules, which is expandable as desired and has a high failure safety. The object is achieved in a space body with at least two space modules, which are interchangeable connectable, comprising a) at least one closable connection opening on each of the space modules, via which a passage is provided when connecting the space modules,
b) at least one coupling device respectively, which connects the space modules,
c) at least one supply interface respectively, for coupling a supply line of the space modules, and
d) resources for supplying the space body which are distributed decentralized in each of the space modules, wherein a resource exchange between the space modules and/or a resource consumption is provided via supply lines.

Such space bodies are mainly used in aerospace, for example with satellites. In doing so, a space module can be coupled to another space module. When coupling the space modules, connection interfaces, which each space module must have, are connected to each other. Via the connection interfaces the supply lines of the space modules are connected to each other, monitored and controlled.

The invention is based on the principle of creating an intelligent space body, especially for extreme conditions as they prevail in aerospace or underwater, which is arbitrarily expandable. The more space modules are coupled, the more complex is their control. In the present invention each space module brings along its own resources, so that the supply of the space body can be configured decentralized. In doing so, a space module can be decoupled without interrupting the supply of a necessary resource. Furthermore, own redundant systems are no longer required, because in the event of a resource failure in the system the networking allows to replace these resources by one or more other space modules. Central resources are more of an obstacle as they always have to be dimensioned accordingly when expanding the space body by further space modules. In the decentralized arrangement the controller is interconnected during coupling via an appropriate network structure of suitable supply lines for the resources. The network structure requires standardized connection interfaces.

As an advantageous embodiment of the space body according to the invention with at least two space modules has been found when a processor-controlled controller for controlling the space modules is provided, wherein the controller as a resource for supplying the space body is provided decentralized in each of the space modules and is networked together via the supply interface for coordinated control of the space body. A processor-controlled controller is provided in each space module, which is for example formed by a suitable computer unit. The processor-controlled controller of a module is always able to work independently in a space module. But they are interconnected in such a manner in the compound of the space body that they provide a combined computing or controlling capacity.

Preferably the controller is then configured as a neural network structure. A neural network structure is able to learn. Thus, learned tasks can be carried out independently by the space body. Such a network structure for a space body makes it flexible and highly adaptable to extreme conditions.

An advantageous embodiment of the space body according to the invention is that gas resources are provided decentralized in the space modules respectively for supplying the space body. The gas resources are present as resource in each space module, i.e. decentralized in the space body. The gas resources can be moved via suitable supply lines between the space modules and be led to consumers if necessary.

Analogous to the gas, in a preferred embodiment of the space body according to the invention with at least two space modules liquid resources are provided decentralized in the space modules respectively for supplying the space body. The liquid resources are also present as a resource in each space module, i.e. decentralized in the space body. The liquid resources can be moved between the space modules and be passed to consumers if necessary via suitable supply lines.

A further a preferred variant of the inventive space body is that thermal resources are provided decentralized in the space modules respectively for supplying the space body either for cooling or for heating. Often a thermal exchange must be possible between the space modules. For example, heat and/or cold storages are provided in the space modules for this purpose. The thermal energy is shifted between the space modules by means of a suitable energy carrier via supply lines as needed.

A further advantageous embodiment of the inventive space body consists in that resources for electric energy are provided decentralized in the space modules respectively, for supplying the space body. Both electric storages, such as batteries and accumulators or electric generator, such as photovoltaic modules or fuel cells are arranged as a resource decentralized in the space body. The electric resources are present in each space module and therefore decentralized in the space body. The electric resources can be moved via suitable electric lines between the space modules and be passed to consumers if necessary.

In a further preferred embodiment of the inventive space body with at least two space modules the supply interface comprises a standardized dockable multiple connection which is provided simultaneously for different supply lines. Often there is the problem that the space modules cannot be coupled compatible with each other. Thus, it is particularly advantageous in the invention if a standardized multiple connection is provided, which implements as far as possible all connections. There is no need to create separate connections for the individual space modules. This is all combined in the multiple connection for the different supply lines. Preferably, the multiple connection also comprises a gas connection and/or a connection for liquids, a connection for communication and/or a connection for electric energy. Especially with the networked control structure it is desirable to standardize the connection. This is achieved much easier with standardized multiple connections. An optional connection for thermal energy provides an optimal distribution of heat between the space modules on demand.

A further advantageous embodiment of the inventive space body with at least two space modules consists in that the multiple connection comprises a connection device for pressure lines. Often also pressure lines must be coupled between the space modules. For example, the pressure lines are used for pneumatic or hydraulic pressure. The multiple connection therefore preferably has a connection device which withstands the required pressure of liquids or gas. For example, hydraulic or pneumatic machines can be driven via the pressure lines. This makes it easy to drive robots or their moving parts.

A particular variant of the space body according to the invention with at least two space modules is that the supply interface is configured for mechanically and/or magnetically and/or electromagnetically coupling. This measure serves for establishing a coupling of the interfaces between two space modules as quickly as possible. This is easily solved by a mechanical, magnetic or electromagnetic coupling mechanism. Combinations of these mechanisms are conceivable.

Furthermore, an advantageous embodiment of the inventive space body with at least two space modules consists in that that the supply interface is configured centrally lockable. This prevents the supply interface from releasing again by itself after a coupling process. Only when a locking mechanism is released again, the connection of the supply interface can be detached. The locking is preferably carried out centrally, so that all desired interfaces of a module are detached simultaneously.

A preferred variant of the inventive space body results from the fact that an energy storage and/or a solar energy supply is provided for energy supply. The energy supply of the space body is preferably ensured thereby, that an energy storage is provided, such as an accumulator. The energy storage can be charged via solar cells. Combustion processes are not given in solar cells. Solar energy is practically unlimited. Thus, the energy for a space body according to the invention is provided advantageously.

A particular embodiment of the inventive space body is achieved in that the space body is configured as a pressure body. This measure serves to ensure that the space body can withstand greater pressure differences. Greater pressure differences occur both in space and underwater. In space, the internal pressure is relatively high, while underwater, the external pressure is quite large.

In an advantageous embodiment of the space body according to the invention with at least two space modules the space modules have a stackable geometry. The advantage of the stackable geometry is that any number of space modules can be connected and stacked like containers. Thus, the space body can be extended to any size, as far as the static stability is given. In this case the space modules can comprise various components that are required for each desired requirement. Preferably, the space modules of the space body have a cubic geometry. Cubic space modules can be stacked particularly well in all possible directions.

For the stackability it is necessary, that not only one coupling device or one supply interface is provided. With one coupling devices per space module only a single space module could be docked to another, which then forms the space body. Further docking of space modules is not possible. Therefore, in another special embodiment of the inventive space body the supply interface is provided on at least two sides of a space module respectively. As a result always more than two space modules can be combined to form a space body.

Furthermore, a particular variant of the space body according to the invention can be achieved in that an inner and/or outer insulation is provided on the space modules. This advantageous measure serves to ensure that the space body is insulated against both cold and heat. The space body should be configured for extreme conditions. This includes thermal requirements. A corresponding insulation helps against this. A special insulation against radiation can also be provided as protection. The insulation can be arranged not only on the outer surfaces, but also on the inner surfaces of the space body or the space modules.

The functions and the status of the space modules must be constantly monitored in case of extreme use of the space body. A special embodiment of the inventive space body with at least two space modules results in that a processor-controlled monitoring device is provided for the space modules. The monitoring device monitors the state of the space body and signals malfunction or the like if necessary.

A further useful embodiment of the inventive space body results from the fact that the monitoring device comprises alternatively or in combination an optical sensor, an acceleration sensor, a motion sensor, a temperature sensor or a position sensor. With these sensors the monitoring device is able to detect and process a part of the environment. The evaluation of the measured signals of the sensors helps to determine the state of the space body.

Furthermore, an advantageous embodiment of the space body according to the invention can be achieved if at least one space module comprises a drive. The drive enables the space body to move. The type of drive and movement is of course dependent on the environment. The underwater drive will usually be a different drive than that used in the air or on land. An appropriate embodiment of the space body according to the invention the space module with a drive comprises a drive control. The drive control controls the drive, for example in acceleration and direction.

In a particularly appropriate variant of the inventive space body the space body is provided for aerospace and/or for use underwater or in live unfriendly environment.

Preferably, in a particular embodiment of the space body according to the invention, an internal supply access is provided within a space module of the space body. Frequently requirements to the space body are that various resources can be accessed inside, such as compressed air or water. A corresponding supply access is therefore provided in at least one space module of the space body. An advantageous aspect of the invention results from the fact that the internal supply access of the space body comprises a connection for gas, a connection for liquid, a connection for communication and/or a connection for thermal energy and/or a connection for electric energy. These supply accesses are particularly important when experiments are performed in such a space body. The experimenters must be able to access the various resources that are available.

Further embodiments and advantages will become apparent from the subject of the dependent claims, as well as the drawings with the accompanying descriptions. An exemplary embodiment is explained below in more detail and with reference to the accompanying drawings. The invention should not be limited to the exemplary embodiment. Rather, embodiments are also considered, which now and in the future will appear to the skilled person in an equivalent manner with other technical aids.

BRIEF DESCRIPTION OF THE DRAWINGS

FIG. 2 shows a supply interface for a space module according to the invention with at least two space modules.

FIG. 3 shows a space body with several stacked space modules.

DETAILED DESCRIPTION

Figure 1:
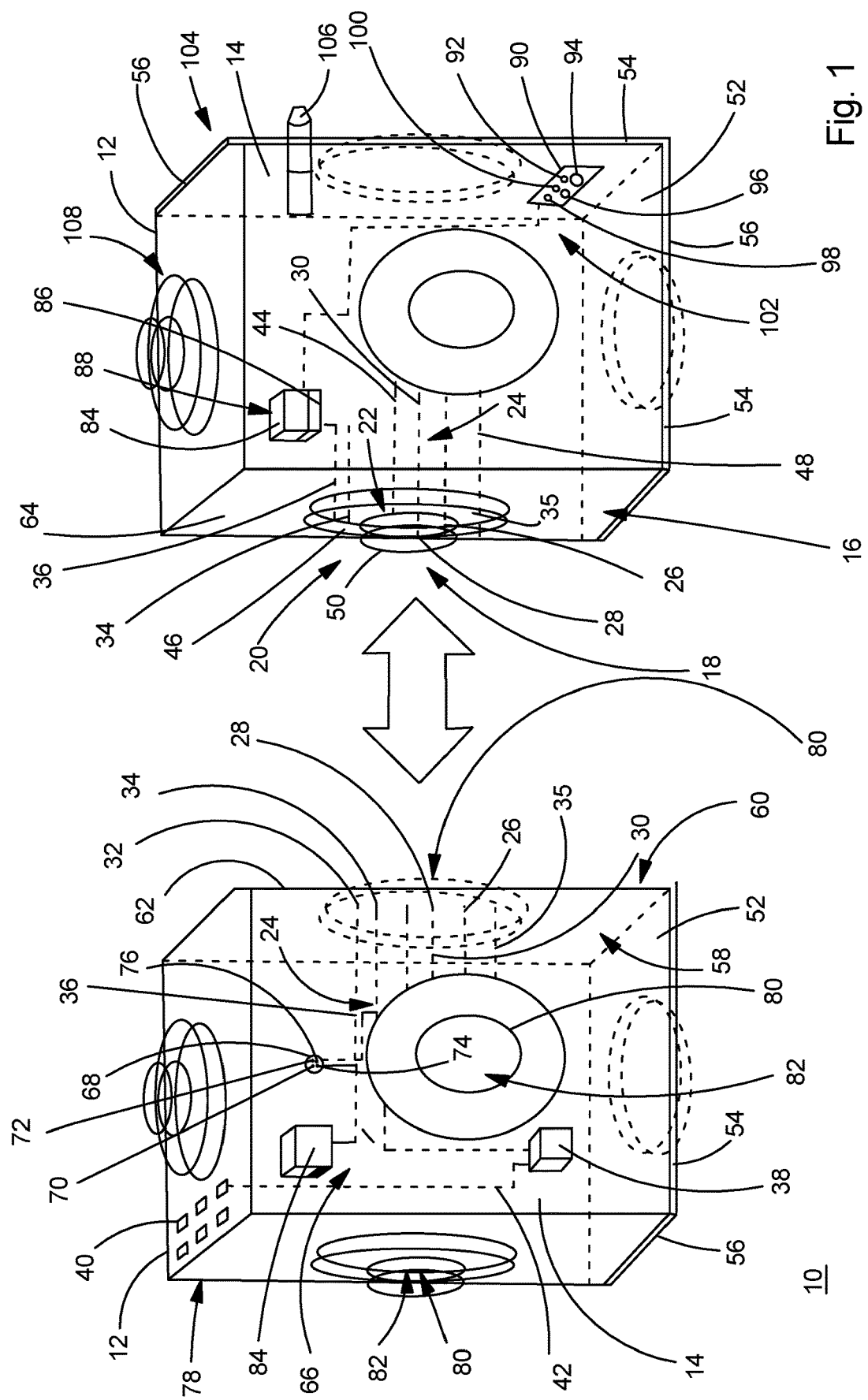
FIG. 1 shows schematically a space body according to the invention with two initially separated space modules.

In FIG. 1 an inventive space body is designated with 10. The space body consists of space modules 12, which can be assembled detachable and interchangeable. In the present embodiment the space modules 12 are configured as two cuboids 14. The cuboids 14 are particular easy to stack and assemble. When stacking always two end faces 16 can be assembled on each other. Other shapes, such as octahedron or other stackable polyhedron may also be used as space module 12. Each space module 12 comprises a coupling device 18 on at least one end face 16. A supply interface 20 is provided at the coupling device 18.

In the present embodiment the supply interface 20 consists of a multiple connection 22, which connects different supply lines 24. With the multiple connection 22, the supply lines 24 of the space modules 12 can be connected to each other in a standardized way. In particular, the multiple connection 22 comprises a connection 26 for gas, through which, for example, oxygen, breathing air or exhaust air can be conducted. In addition, the multiple connection 22 comprises a connection 28 for liquids. For example, water is pumped through liquid lines 30 via such a liquid connection 28. A heated liquid can be conducted via the liquid lines 30 for heating one or all space modules 12. Furthermore, the multiple connection 22 comprises a communication connection 32, an electrical connection 34 for electric energy and a connection 35 for thermal energy. Via the connection 35 for thermal energy the heat balance of the entire system is regulated and heat energy is distributed and compensated.

Data lines 36 can be coupled together by the communication connection 32. The data lines 36 are used to exchange digital data between the space modules 12. In the present embodiment the data lines 36 are configured as cable. In principle, the data exchange between the space modules 12 can also be realized via electromagnetic waves, such as radio waves or light waves. For this purpose, suitable transmitting and receiving units have to be provided.

The electric connection 34 is provided for the energy exchange of electrical energy between the space modules 12. In this case, an energy generator 38 for electric energy can be provided on or in a space module 12. The energy generator 38 is, for example, an accumulator, which is fed by solar cells 40. The energy of the energy generator 38 is distributed in the space modules 12 via electric lines 42, usually cable.

Such space modules 12 are basically also suitable for robotics. Therefore pressure lines 44 are provided for liquids and gases with which, for example, robot parts can be driven pneumatically or hydraulically. But working gases with increased pressure can also be led through the pressure lines 44.

The coupling device 18 comprises magnetic coupling mechanism 46, whereby the supply interfaces 20 can be coupled in pairs. The magnetic coupling mechanism 46 has at least one electromagnet 48 respectively, for increasing the attraction force. The space modules 12 and the coupling device 18 attract each other via the magnetic coupling mechanism 46. After the coupling devices 18 and the supply interfaces 20 of the space modules 12 are connected to each other, a mechanical locking mechanism 50 engages for security. The electro magnet 48 of the magnetic coupling mechanism 46 can be turned off now if necessary, i.e. to save energy, for example.

The space body 10 or its space modules 12, of which the space body 10 is made, are configured as pressure bodies 52. The pressure bodies 52 are particularly required for use, for example, under water. The space modules must withstand extremely high pressures under water, depending on the depth. On the other hand, the pressure difference of the space modules 12 to the vacuum, which prevails in space, has to be endured also. For extreme temperatures, both in the heat range, as well as in the cold range a suitable thermal insulation 54 is provided. The insulation 54 comprises a protection layer 56, which protects the space body 10 against radiation. The insulation 54 may be provided on the inside 58 of the space modules 12 or on the outside 60 of the space modules 12.

The space modules 12 of the space body 10 have a cubic geometry, because such geometric bodies can be stacked very well. Thereby, a different space module 12 can be coupled to outer surface. Basically, other geometries of space modules are also conceivable, but they must be well stackable. Stacking in this context means that at least one plan outside surface 62 of a space module 12 is parallel to the plan outside surface 64 of another space module 12 and can be joined together. The stackability allows expanding the space body 10 in size as desired. Each space module 12 can be assigned its own function. In doing so, any constellation of space bodies 10 can be created, as can be seen well in FIG. 3.

In the interior 66 of the space module 12 internal supply accesses 68 are provided. In this case, an internal connection 70 for gas, a connection for liquid 72, a data connection 74 and a connection 76 for electric energy are provided. The supply accesses 68 also make it possible to be supplied with appropriate resources in the interior 66 of the space modules 12. If a space module 78 is used, for example, for experiments, an experimenter can use the supply accesses 68.

The space modules 12 have closable openings 80, which serve as passages 82. Due to the closable openings 80 there is a continuous spatial connection between the space modules 12. On the one hand one can move through the openings 80 or on the other hand material or lines can be passed through. Of course the type of use depends on the size of the openings 80 and the passages 82.

Each of the space modules 12 has its own resources, which it provides to the entire system of the space body 10 in the coupled state. The space modules 12 comprise as a resource in particular a processor-controlled controller 84 with memory 86 and program or function structures. The controller 84 controls the processes to be controlled in each space modules 12 if they are self-sufficient. Once the space modules 12 are coupled to each other to form a space body 10 the controller 84 of the individual space modules 12 are networked. The data lines 36 connect the controller 84 via the communication connections in a suitable manner. As a result, the computing capacity of the space body 10 is increased according to the number of space modules 12. Instead of a central computer unit the space body 10 is now controlled by many decentralized controller 84 as a control network 88. In case of a failure of a controller 84 of a space module 12, the tasks and functions can be taken over by other controller 84. The control network 88 is preferably configured as a neural network. Thus, the control network 88 is able to learn and independently adapt itself to different circumstances. This adaptability is particularly required when the space body 10 is unmanned on its way.

The control network 88 controls and monitors all operations in the space body 10. Suitable sensors 90 are provided in order to detect the outside world by the control network 88. Thus, the control network 88 is connected to at least one optical sensor 92, such as a digital camera. In addition, at least one acceleration sensor 94 provides motion data to the control network 88. A position sensor 96 continuously detects the position of the body 10 and provides appropriate data to the control network 88. Motion sensors 98 monitor the motion within the space body 10. The evaluation of the motion sequences is carried out via the control network 88. Pressure sensors 100 detect the pressure within the space body 10. The control network 88 can regulate the pressure in the space body 10 to a fixed setpoint. Together with the sensors 90 the control network 88 forms a monitoring device 102, with which the space body 10 can be monitored in its functions.

In particularly, the coupling device 18, the closeable openings 80 and the supply interfaces 20 are controlled via the control network 88. The control network 88 coordinates all the work and the total functions of the space modules 12 with each other.

One space module 104 comprises a drive 106. The drive control is taken over by the control network 88 in the present embodiment. In principle, a separate drive control for the drive 106 in the space module 104 is also possible. The drive 106 serves for moving the space body 10. The drive can be configured in various ways, such as a jet drive or a rocket drive.

Other resources like gas resources, liquid resources, thermal and electric resources are included in each space module 12. In the coupled state, the resources are available decentralized in the entire space body 10. The resources are always available to the space body 10 as a whole. Through the supply lines 24 the resources can finally be moved through the space body, as it is required for the function and work respectively. The failure of a resource of a space module 12 is taken over by the other space modules 12 which have no malfunction. Thus, the space body 10 as a whole remains fully functional.

In FIG. 2 the supply interface 20 for the space module 10 according to the invention with at least two space modules is shown schematically. The supply interface 20 comprises the multiple connection 22, which has already been described with reference to FIG. 1. The multiple connection 22 connects the different supply lines 24 in a standardized manner. The multiple connection 22 comprises in particular the gas connection 26, the connection 28 for liquids, the communication connection 32 and the electric connection 34 for electric energy.

The communication connection 32 is particularly important for networking the controller 84 to a control network 88. The space modules 12 can exchange data or control commands via the control network 88. Liquids and gases are led through the pressure lines 44.

FIG. 3 shows the space body 10 in a schematic and perspective view, in which a plurality of stacked space modules 12 are composed container-like. From this it becomes clear how important the geometry of the space modules 12 is for the stackability. In this space body 10 the solar cells 40 are arranged on an outer surface 108 for the power supply, in particular for charging an accumulator.

LIST OF REFERENCE NUMERALS 10 space body
12 space modules
14 cuboid
16 end faces
18 coupling device
20 supply interface
22 multiple connection
24 supply lines
26 gas connection
28 liquid connection
30 liquid lines
32 communication connection
34 electrical connection
35 connection for thermal energy
36 data lines
38 energy generator
40 solar cells
42 electric lines
44 pressure lines 46 magnetic coupling mechanism
48 electromagnet
50 locking mechanism
52 pressure body
54 insulation
56 protection layer
58 inside of the space module
60 outside of the space module
62, 64 outside surface of a space module
66 interior of a space module
68 internal supply accesses
70 gas connection
72 liquid connection
74 data connection
76 connection for electric energy
78 space module for experiments
80 closeable opening
82 passages
84 processor-controlled controller
86 memory
88 control network
90 sensors
92 optical sensor
94 acceleration sensor
96 position sensor
98 motion sensor
100 pressure sensor
102 monitoring device
104 space module with drive
106 drive
108 outer surface

The invention claimed is:

1. A space body with at least two interchangeably connectable space modules, comprising:
    at least one closable connection opening on each of the space modules, via which a passage is provided when connecting the space modules;
    at least one coupling device on each of the space modules for connecting the space modules;
    at least one supply interface with a magnetic coupling mechanism on each of the space modules, for magnetically coupling a supply line which extends through the connection openings of two connected ones of the space modules;
    a mechanical locking mechanism for mechanically coupling the supply line; and
    decentralized resources for supplying the space body distributed in each of the space modules, wherein a resource exchange between the space modules is provided via the supply line,
    wherein the magnetic coupling mechanism comprises an electromagnet for magnetically coupling the supply line,
    wherein the supply interface is configured to engage the mechanical locking mechanism and thereby mechanical couple the supply line after the supply line has been magnetically coupled with support of the electromagnet, and
    wherein the supply interface is configured to turn off the electromagnet after the mechanical locking mechanism is engaged.

2. The space body according to claim 1,
    wherein a processor-controlled controller for controlling the space modules is provided,
    wherein the controller as a resource for supplying the space body is provided decentralized in each of the space modules and is networked together via the supply interface for coordinated control of the space body.

3. The space body according to claim 2, wherein the controller is configured as a neural network structure.

4. The space body according to claim 1, wherein gas resources are provided decentralized in the space modules respectively for supplying the space body.

5. The space body according to claim 1, wherein liquid resources are provided decentralized in the space modules respectively for supplying the space body.

6. The space body according to claim 1, wherein thermal resources are provided decentralized in the space modules respectively for supplying the space body either for cooling or for heating.

7. The space body according to claim 1, wherein resources for electric energy are provided decentralized in the space modules respectively for supplying the space body.

8. The space body according to claim 1, wherein the at least one supply interface comprises a standardized dockable multiple connection, for magnetically coupling the supply line and at least one further supply line.

9. The space body according to claim 8, wherein the multiple connection comprises
    a) a connection for gas and/or
    b) a connection for liquid and/or
    c) a connection for communication and/or
    d) a connection for thermal energy and/or
    e) a connection for electric energy.

10. The space body according to claim 8, wherein the multiple connection comprises a connection device for pressure lines.

11. The space body according to claim 1, wherein an energy storage and/or a solar energy supply is provided for energy supply.

12. The space body according to claim 1, wherein the space body is configured as a pressure body.

13. The space body according to claim 1, wherein the space modules have a stackable geometry.

14. The space body according to claim 1, wherein the space modules have a cubic geometry.

15. The space body according to claim 1, wherein the supply interface is provided on at least two sides of a space module respectively.

16. The space body according to claim 1, wherein an inner and/or outer insulation is provided on the space modules.

17. The space body according to claim 1, wherein a processor-controlled monitoring device is provided for the space modules.

18. The space body according to claim 17, wherein the monitoring device comprises
    a) an optical sensor and/or
    b) an acceleration sensor and/or
    c) a motion sensor and/or
    d) a temperature sensor and/or
    e) a position sensor.

19. The space body according to claim 1, wherein at least one space module comprises a drive.

20. The space body according to claim 19, wherein the space module with the drive comprises a drive control.

21. The space body according to claim 1, wherein the space body is provided for aerospace and/or for use underwater or in a life-unfriendly environment.

22. The space body according to claim 1, wherein an internal supply access is provided within a space module of the space body.

23. The space body according to claim 22, wherein the internal supply access comprises a) a connection for gas and/or
b) a connection for liquid and/or
c) a connection for communication and/or
d) a connection for thermal energy and/or
e) a connection for electric energy.

* * * * *